3,719,509
METHOD OF STABILIZING POLYMERIC ORGANIC COMPOSITIONS WITH 3',5' - DIBROMO - 2'-HYDROXYACETOPHENONE
Stanley J. Buckman and John D. Pera, Memphis, Tenn., assignors to Buckman Laboratories, Inc., Memphis, Tenn.
No Drawing. Filed Jan. 4, 1971, Ser. No. 103,815
Int. Cl. C09d 5/14, 5/16; C09k 3/28
U.S. Cl. 106—15 FP     18 Claims

ABSTRACT OF THE DISCLOSURE

The preparation of 3',5'-dibromo-2'-hydroxyacetophenone and its use as an ultraviolet light absorber and as a fire retardant for polymeric and organic coating compositions are described.

---

This invention relates to a method whereby the resistance of polymeric organic materials and polymeric organic coating compositions, hereinafter called "polymeric organic compositions," to the deteriorating effects of ultraviolet light and to fire are increased. More particularly, the foregoing objectives are accomplished by incorporating into the polymeric organic compositions the compound 3',5'-dibromo-2'-hydroxyacetophenone.

It is well known that many organic compositions such as polymeric organic compositions tend to undergo deterioration when exposed to ultraviolet light. Light in the ultraviolet portion of the spectrum and particularly that having a wavelength within 290–400 millimicrons causes photocatalyzed changes, such as yellowing and/or embrittlement of unstabilized polymeric compositions. These changes are obviously undesirable and this is particularly true when the composition is initially colorless, transparent, or translucent and is to be used subsequently under conditions that will subject it to long exposure to sunlight or other sources of ultraviolet light radiation. Examples of such applications include translucent roofing materials, transparent structures, decorative structures, decorative and protective coatings, and impact-resistant windows.

In recent years, many organic compounds have become available which can absorb ultraviolet light and convert it to less harmful forms of energy such as heat, vibrational energy, or less harmful radiation. These organic stabilizers, in addition to absorbing ultraviolet radiation in the selected range for the polymeric compositions being treated, must be compatible therewith, have little or no initial color, be reasonably inexpensive, be chemically stable, and have a low toxicity, especially for stabilizing compositions to be used subsequently in the food industry.

A good ultraviolet absorber for use in polymeric organic compositions should absorb the ultraviolet radiation in daylight, impart no or very little color to the composition, should be sufficiently stable to withstand curing conditions, and should absorb ultraviolet light sufficiently to protect the composition against yellowing and decomposition on exposure to ultraviolet light. The compound must have sufficient solubility in various types of materials so that it may be incorporated therein, it should be capable of withstanding leaching action of solvents or loss by exudation.

Generally, an effective ultraviolet absorber should have its peak absorption above a wavelength of 300 millimicrons or the absorption peak may be at a higher wavelength as long as the absorption drops off sufficiently as it approaches the visual range so that no color is visible. In addition, to be effective it should show a high degree of absorbancy in the desired wavelength range, especially at those wavelengths sufficiently below the visual range so that the compound has no yellow color.

Although, as pointed out above, many compounds have been suggested for the stabilization of polymeric organic compositions against deterioration caused by ultraviolet light, none have been entirely satisfactory as all have been deficient in one or more qualities which the ideal ultraviolet absorber must possess. These include, in addition to lack of color, the ability to become firmly incorporated in the composition to be stabilized and the ability to absorb ultraviolet light over a wide range. The latter is important because individual polymeric organic compositions are generally most susceptible to deterioration by radiation of a specific wavelength. For example, polyethylene, polypropylene, and polystyrene are susceptible to radiation wavelengths of 300–320 millimicrons. Many of the absorbers disclosed in the prior art exhibit excellent ultraviolet light absorption only over a very limited wavelength. Another criteria of a polymeric organic composition in addition to its resistance to deterioration on exposure to ultraviolet light is that it be as resistant to fire as possible.

Heretofore when it was necessary to protect polymeric organic compositions against deterioration caused by exposure to ultraviolet light and to impart fire-retardant properties to the composition, the use of two additives was mandatory; one to protect the composition against ultraviolet light and the other to attain the desired fire-retardant properties. This is objectionable because when two additives are used, each must not only perform its particular function effectively, but, in addition, the two must be compatible. Obviously, a single compound effective both as an ultraviolet light absorber and as a fire-retardant would eliminate completely the compatibility requirement and for that reason be desirable.

It is, therefore, a principal object of the present invention to provide an additive for polymeric organic compositions which is effective as an ultraviolet light absorber and is capable of rendering such compositions fire-retardant.

It is another object of our invention to provide a composition which is resistant to degradation by ultraviolet light radiation and is fire resistant.

These and other objects and advantages will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by incorporating into a polymeric organic composition susceptible to deterioration by the action of ultraviolet light radiation and fire the compound 3',5'-dibromo-2'-hydroxyacetophenone in an amount varying from about 0.5 percent to about 15 percent or more by weight based on the total weight of the polymeric organic composition. We have found that this compound because of its outstanding ultraviolet light absorbing properties over a wide range of wavelengths combined with its ability to impart fire-retardant properties to the finished product make it an ideal additive for polymeric organic compositions.

Polymeric organic compositions which can be protected from the degrading effects of ultraviolet light and/or fire by the use of 3',5'-dibromo-2'-hydroxyacetophenone include alkyd resins as disclosed in U.S. Pats. 1,847,783, 1,860,164, 1,950,468, and 2,087,852; epoxy resins as disclosed in U.S. Pat. 2,886,473; polyester resins;

polyurethane; polyethylene; polypropylene; polystyrene; polyvinyl chloride resins; cellulosic and acrylic polymers; linear super polyamide obtained by condensing an aliphatic polyethylenediamine with a dicarboxylic acid; industrial coatings including decorative and protective coatings wherein one or more of the components thereof comprises an organic composition suscetpible to deterioration when exposed to ultraviolet light or heat; coated fabrics such as fabrics coated with polyvinyl chloride and polyolefin; and polyvinylidene chloride monofilaments.

In order to disclose the nature of the invention still more clearly, the following illustrative examples will be given. It is understood, however, that the invention is not to be limited to the specific conditions or details set forth in these examples, except insofar as such limitations are specified in the appended claims.

In the examples, "parts" where used are parts by weight.

EXAMPLE 1

Preparation of 3',5'-dibromo-2'-hydroxyacetophenone

Bromine substitution of 2'-hydroxyacetophenone may occur on the benzene ring, the aliphatic side chain, or both, depending upon the specific experimental conditions followed. Heretofore if the desired result was substitution on the ring, the reaction was conducted by adding bromine to a solution of 2'-hydroxyacetophenone whereby the desired product was obtained in about a 55 to 70 percent yield. Suitable solutions for use in this reaction have been restricted to glacial acetic acid and an alkali-metal acetate, acetic acid and water, ethanol and water, and isopropanol and water.

We have now unexpectedly found that 3',5'-dibromo-2'-hydroxyacetophenone can be obtained in almost quantitative yields by the bromination of an aqueous suspension of 2'-hydroxyacetophenone at a temperature range which may vary from about 25° to about 100° C., but preferably from about 50° to about 60° C., for a period of time varying from about 1 to about 30 hours.

In this example, two runs were made:

Run No. 1: A 5-liter, four-necked, round-bottom reaction flask equipped with a stirrer, thermometer, condenser, and dropping funnel was charged with 544.6 grams (4 moles) of 2'-hydroxyacetophenone and 2,400 grams of water and the temperature raised to 50–60° C. Bromine was added slowly beneath the surface of the liquid for a period of 3 hours while the temperature was maintained at 50–60° C. A total of 671 grams (8.4 moles) of bromine was added. The product precipitated as a pale yellow solid during the bromine addition. After the bromine addition was completed, the reaction mixture was stirred for 30 minutes and then heated at reflux (105° C.) for 10 minutes. The crude reaction product melted and settled to the bottom of the flask when the agitator was stopped. This lower layer quickly solidified when the reaction mixture was cooled and the water layer containing hydrogen bromide formed during the reaction was removed by decantation.

Two liters of water was added to the reaction flask and the mixture was heated and agitated at reflux for 10 minutes. The agitator was stopped and the mixture cooled. The product, which again settled to the bottom of the flask as a liquid layer and crystallized, was obtained by decanting the water layer. The product layer was melted and poured into a Pyrex dish to cool. This treatment removed residual water and the crude pale-yellow product was obtained in essentially a quantitative yield and had a melting point of 100–105° C.

Recrystallization of the crude product from isopropanol gave 3',5'-dibromo-2'-hydroxyacetophenone as pale yellow needles with a melting point of 108–110° C. The ultraviolet spectrum showed a very strong absorption maximum at 347 millimicrons.

Run No. 2: A 100-gallon, glass-lined reaction vessel equipped with a heating jacket and agitator was charged with 110 pounds (0.81 pound mole) of 2'-hydroxyacetophenone and 485 pounds of water and the temperature raised to 55° C. Bromine vapor obtained by boiling liquid bromine in a separate glass container was passed into the reactor above the liquid level at a constant rate for 25 hours while the temperature was maintained between 50° and 60° C. A total of 265 pounds (1.66 pound moles) of bromine was added. After the bromine addition was completed, the reaction mixture was agitated for 30 minutes and then heated at 105° C. for 30 minutes. A small amount of excess bromine and about 15 pounds of water were removed from the reaction mixture. The agitator was then stopped and the liquified product was removed through a valve at the bottom of the reactor.

The water-hydrogen bromide solution left in the reactor was removed and the reactor was rinsed and charged with 480 pounds of water. The water was heated to 100° C. and the crude product, which had solidified, was added to the hot water. The reactor was sealed and heated to 110° C. for 15 minutes. The product was again removed from the bottom of the reactor as a liquid which quickly soldified to a pale yellow crystalline solid with a melting point of 105–107° C. The total yield was 240 pounds of 3',5'-dibromo-2'-hydroxyacetophenone.

EXAMPLE 2

Plasticized polyvinyl chloride

In this example, the effect of various amounts of 3',5'-dibromo-2'-hydroxyacetophenone on a plasticized polyvinyl chloride film was determined. Five such film samples were prepared by dry blending at 88° C. as follows:

Sample No. 1 contained 1.0 part barium stearate, 1.0 part cadmium stearate, 60 parts dioctyl phthalate, and 100 parts polyvinyl chloride. The dry-blended material was fused at 175° C. for 5 minutes. The fused mass was chopped and the resulting granules were pressed into a sheet at 165° C. with a Carver press.

Samples Nos. 2, 3, 4, and 5 were prepared by the same procedure as Sample No. 1 except that 1.0, 2.0, 5.0, and 10.0 parts of 3',5'-dibromo-2'-hydroxyacetophenone was added to each sample, respectively, before blending.

Sheets of approximately 25 and 60 mils thickness were made.

The 25-mil thick films were used to determine the effectiveness of the acetophenone derivative in ultraviolet light absorption by exposure in a chamber with a combination of ultraviolet light and daylight from fluorescent tubes. Each sample was exposed so that the film protected a portion of a light-colored maple tongue blade. After 240 hours' exposure, the wood exposed directly to the light and the wood exposed behind the film of Sample No. 1 showed considerable darkening. In contrast, the wood protected by those films containing 1.0, 2.0, 5.0, and 10.0 parts of 3',5'-dibromo-2'-hydroxyacetophenone showed no darkening.

Film Samples Nos. 4 and 5 containing 5.0 and 10.0 parts of 3',5'-dibromo-2'-hydroxyacetophenone showed considerably less curling and exuding of the plasticizer than those samples containing lesser quantities of the acetophenone.

The five film samples were used to evaluate fire resistance imparted by the acetophenone derivative. Due to their flexibility, the 0.5 x 5 inch samples were hung vertically and ignited for 15 seconds with a Bunsen burner in a vented hood. Although all samples were self-extinguishing on removal of the Bunsen burner, the duration of the flame varied inversely with the acetophenone content.

EXAMPLE 3

Fiber glass-reinforced polyester

Samples of fiber glass-reinforced polyester plastic were made with 0.0, 1.0, 2.0, 3.0, 4.0, and 5.0 parts of 3',5'-dibromo-2'-hydroxyacetophenone per 100 parts of a resin comprising 65 parts of tetrachlorophathalic anhydride polyester and 35 parts of styrene. The catalyst was 1 part of benzoyl peroxide and 0.8 part of cumene hydrogen peroxide. Various combinations of 3',5'-dibromo-2'-hydroxyacetophenone and tris(dibromopropyl)phosphate in 100 parts of resin were also tested as follows:

| 3',5'-dibromo-2'-hydroxyacetophenone: | Tris(dibromopropyl) phosphate |
|---|---|
| 1.0 | 6.0 |
| 2.0 | 6.0 |
| 3.0 | 6.0 |
| 3.0 | 4.0 |
| 3.0 | 2.0 |

The ratio of fiber glass to polyester resin was approximately 1 to 3 by weight. The samples were formed on glass between two sheets of cellophane separated by a 3-millimeter glass rod, and heat cured at 80° C. for 20 minutes.

Samples were cut into 0.5 x 4.5 inch pieces and tested for fire resistance in a procedure similar to that in ASTM 635–63. By recording the time in seconds required for the flame to be extinguished or for the flame to burn to the 4-inch mark, the flame resistance offered by the product at various concentrations is determined. Increasing the concentration of the product in the plastic resulted in shorter flame time. The use of 2 parts or more of the product converted the plastic from a "burning" material to a "self-extinguishing" material. The time required for self-extinguishing to occur or for 4 inches of sample to burn varied from an average of 210 seconds for the control plastic (0.0 part of the brominated acetophenone) to 32 seconds for the plastic with 5.0 parts of the acetophenone to 1 second for the plastic with 3 parts of the acetophenone and 6 parts of tris(dibromopropyl)phosphate. A special sample containing 6 parts of tris(dibromopropyl)phosphate burned an average of 3.6 seconds.

The effect of ultraviolet light on each of the plastic samples was determined by placing samples in a chamber with ultraviolet light and daylight from fluorescent tubes. After 100 hours' exposure, all samples were discolored, although those samples containing the acetophenone showed less coloration. The amount of coloration varied inversely as the amount of the acetophenone derivative increased.

EXAMPLE 4

Clear varnishes

In this example, 3',5'-dibromo-2'-hydroxyacetophenone was added to each of three different clear coating compositions of 50 percent solids identified as follows: Medium soya alkyd resin, air-drying polyurethane resin, and a tung oil varnish at concentrations of 0.0, 0.5, and 1.0 percent by weight based on the total weight of the clear coating. These coatings were applied to maple wood surfaces. Two coats were applied allowing 24 hours between coats for drying. After the second coat had dried, a portion was cut from each of the maple specimens and retained in the dark. The remaining portion of each specimen was exposed in a chamber lighted with ultraviolet light and daylight from fluorescent tubes.

After 48 hours' exposure, the color of the exposed surface was compared to that retained in a darkened area. All samples of varnish coatings containing 1.0 percent of the acetophenone derivative were less discolored than those containing lesser quantities.

EXAMPLE 5

Polypropylene resin

In this example, the effect of various amounts of 3',5'-dibromo-2'-hydroxyacetophenone on a polypropylene film was determined. Five such films were prepared as follows:

Sample No. 1, which contained 100 parts unstabilized polypropylene, 0.1 part dilauryl thiodipropionate, and 1.0 part of a hindered phenol was fused in a Plasti-Corder blender at 175° C. for 5 minutes. The hindered phenol used was a product available under the trademark Irganox 1076, which is an alkyl ester of a carboxylic acid containing an alkylhydroxy phenyl group. This product is further identified in U.S. Pat. 3,330,859. The fused material was chopped and the resulting granules pressed into sheets about 25 and 60 mils thick using a Carver press at about 165° C.

Samples Nos. 2, 3, 4, and 5 were prepared by the same procedure as Sample No. 1 except that 1.0, 2.0, 5.0, and 10.0 parts of 3',5'-dibromo-2'-hydroxyacetophenone was added to each sample, respectively, before fusion.

The 25-mil thick films were used to determine the effectiveness of the acetophenone derivative as an ultraviolet light absorber by exposing the five films in chambers lighted with ultraviolet light and daylight fluorescent tubes for 10 days. At the end of this period, there was less crazing and embrittlement of the samples with increasing quantities of the acetophenone derivative used.

The 60-mil thick film samples were evaluated for fire resistance according to ASTM D 635. The time required for the sample to burn 4 inches increased directly with the amount of the acetophenone derivative present in the sample.

EXAMPLE 6

Polyethylene resin

In this example, the effect of various amounts of 3',5'-dibromo-2'-hydroxyacetophenone on a polyethylene film was determined. Five such films were prepared as follows:

Sample No. 1 was prepared by fusing 100 parts of polyethylene in a Plasti-Corder blender at 175° C. for 5 minutes. The fused material was chopped and the resulting granules pressed into sheets about 25 and 60 mils thick using a Carver press at about 165° C.

Samples Nos. 2, 3, 4, and 5 were prepared by the same procedure as Sample No. 1 except that 1.0, 2.0, 5.0, and 10.0 parts of 3',5'-dibromo-2'-hydroxyacetophenone were added to each sample, respectively, before fusion.

The 25-mil thick films were tested by exposure in a chamber lighted with ultraviolet light and daylight fluorescent tubes. After 4 days' exposure, those films containing the acetophenone derivative showed less embrittlement than the control film. The film samples containing increasing amounts of the additive showed progressively increased resistance to embrittlement.

The 60-mil thick film samples were tested for fire resistance by measuring the time required to burn 4 inches of the film which was 0.5 inch wide. Our results demonstrated that the greater the amount of acetophenone derivative present in the film, the greater the time required.

EXAMPLE 7

Similar beneficial results were obtained when 3',5'-dibromo-2'-hydroxyacetophenone was incorporated into epoxy resins, polyurethane, polystyrene, and cellulosic and acrylic polymers in the amounts and following the procedure as disclosed in Example 2.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of stabilizing a polymeric organic composition susceptible to degradation by ultraviolet light and fire when exposed thereto, which comprises adding to said polymeric organic composition the compound 3',5'-dibromo-2'-hydroxyacetophenone in an amount sufficient to stabilize said polymeric organic composition against ultraviolet light and fire.

2. The method of claim 1 wherein the polymeric organic composition is polyvinyl chloride.

3. The method of claim 1 wherein the polymeric organic composition is polyethylene.

4. The method of claim 1 wherein the polymeric organic composition is polypropylene.

5. The method of claim 1 wherein the polymeric organic composition is polystyrene.

6. The method of claim 1 wherein the polymeric organic composition is an epoxy resin.

7. The method of claim 1 wherein the polymeric organic composition is a cellulosic polymer.

8. The method of claim 1 wherein the polymeric organic composition is an acrylic polymer.

9. The method of claim 1 wherein the polymeric organic composition is a polyvinylidene chloride.

10. The method of claim 1 wherein the polymeric organic composition is polyvinyl acetate.

11. The method of claim 1 wherein the polymeric organic composition is a polyvinylethylene acetate.

12. The method of claim 1 wherein the polymeric organic composition is a polyvinyl acrylate.

13. The method of claim 1 wherein the polymeric organic composition is a styrene-butadiene copolymer.

14. The method of claim 1 wherein the polymeric organic composition is a styrenated-vinyl-acrylic terpolymer.

15. The method of claim 1 wherein the polymeric organic composition is an acrylic-butadiene-styrene terpolymer.

16. The method of claim 1 wherein the polymeric organic composition is a polymerized drying oil.

17. The method of claim 1 wherein the polymeric organic composition is a polymerized linseed oil.

18. The method of claim 1 wherein the polymeric organic composition is a polymerized tung oil.

References Cited

UNITED STATES PATENTS

| | | | |
|---|---|---|---|
| 2,116,104 | 5/1938 | Dohrn et al. | 260—592 |
| 2,876,210 | 3/1959 | Wynn et al. | 260—45.95 |
| 2,976,259 | 3/1961 | Hardy et al. | 260—45.95 |
| 3,000,853 | 9/1961 | Havens | 260—45.95 |
| 3,192,179 | 6/1965 | Spatz et al. | 260—45.95 |

FOREIGN PATENTS

| | | | |
|---|---|---|---|
| 943,937 | 12/1963 | Great Britain | 260—45.75 |

JOAN B. EVANS, Primary Examiner

U.S. Cl. X.R.

106—18, 163, 187, 189, 190, 263; 252—301.2; 260—45.95